United States Patent [19]

Wilber

[11] Patent Number: 5,264,762
[45] Date of Patent: Nov. 23, 1993

[54] PICTURE HEIGHT ADJUSTMENT ARRANGEMENT FOR A VIDEO DISPLAY

[75] Inventor: James A. Wilber, Indianapolis, Ind.

[73] Assignee: Thomson Consumer Electronics, Inc., Indianapolis, Ind.

[21] Appl. No.: 911,683

[22] Filed: Jul. 10, 1992

[51] Int. Cl.[5] .............................................. H01J 29/54
[52] U.S. Cl. ................................. 315/398; 315/389; 315/403
[58] Field of Search ................. 315/403, 398, 387, 389

[56] References Cited

U.S. PATENT DOCUMENTS

| | | |
|---|---|---|
| 4,048,544 | 9/1977 | Haferl . |
| 4,088,931 | 5/1978 | Haferl . |
| 4,277,729 | 7/1981 | Rodgers . |
| 4,645,987 | 2/1987 | Kiteley et al. ..................... 315/389 |

OTHER PUBLICATIONS

Appl. Ser. No. 843,061, filed Mar. 2, 1992 the names of Koblitz et al. and entitled Service Adjustment Arrangement For A Sawtooth Generator of a Video Display.
Appl. Ser. No. 911,421, filed Jul. 10, 1992 in the names of Wilber et al. and entitled Vertical Deflection Arrangement For Zoom and Pan Features.
Appl. Ser. No. 911,605, filed Jul. 10, 1992 in the name of J. A. Wilber and entitled Reduced Dissipation Vertical Deflection Circuit For Zoom Mode Operation.
Appl. Ser. No. 911,600, filed Jul. 10, 1992 in the name of J. A. Wilber and entitled A Vertical Deflection Arrangement With S-Correction.
An article entitled a New Video Processor For Color TV in the names of Yamamoto et al., dated 1988 and published by IEEE.

Primary Examiner—Theodore M. Blum
Attorney, Agent, or Firm—Joseph S. Tripoli; Joseph J. Laks; Sammy S. Henig

[57] ABSTRACT

A first voltage-to-current converter responsive to a picture height adjustment control signal generates a first current in a capacitor for producing a trace portion of a sawtooth signal in the capacitor having a rate of change that is adjustable in accordance with an adjustment of the control signal. A second voltage-to-current converter responsive to the control signal generates a second current in a resistor for producing a third signal that is adjustable in accordance with the control signal. The sawtooth and third signals are coupled via a differential amplifier to a vertical deflection winding to produce a vertical deflection current in accordance with a difference between the sawtooth and third signals such that picture height adjustment does not affect vertical centering.

12 Claims, 6 Drawing Sheets

PICTURE HEIGHT ADJUSTMENT ARRANGEMENT FOR A VIDEO DISPLAY

This invention relates to video display apparatus. In particular, the invention relates to height adjustment of a deflection circuit.

Typically, a vertical sawtooth generator of a vertical deflection circuit in a television receiver utilizes a current integrating capacitor that is charged from a source of a D.C. current to produce a ramp, trace portion of an output sawtooth signal synchronized to a vertical synchronizing signal. The trace portion of the sawtooth signal controls a trace portion of a vertical deflection current that produces vertical deflection in a cathode ray tube (CRT).

In a vertical deflection circuit, embodying an aspect of the invention, the rate of change of the trace portion of the sawtooth signal is selectable to provide for zoom mode of operation. The sawtooth signal is D.C. coupled to an input of a vertical deflection amplifier to form a D.C.-coupled vertical deflection circuit coupled to an input of the amplifier in a negative feedback manner. During manufacture and assembly of the television receiver, it may be necessary or desirable to adjust the amplitude of the vertical deflection current for adjusting vertical "height" of the raster. It may be desirable to provide vertical height by adjustment of the sawtooth signal of the D.C.-coupled vertical deflection circuit in such a way that adjustment of vertical height has only minimal effect on vertical centering.

A video display apparatus embodying an aspect of the invention includes a capacitor and a source of a first current coupled to the capacitor and responsive to a control signal for developing a ramping trace portion of a sawtooth voltage in the capacitor. The sawtooth voltage has a rate of change that is adjusted in accordance with the first current such that a change in the control signal also causes a change in an average value of the capacitor voltage. A retrace portion of the sawtooth voltage is generated at a frequency related to a deflection frequency. A deflection winding is disposed on the cathode ray tube for producing a raster on a display screen of the cathode ray tube. An amplifier is responsive to the sawtooth voltage and to the control signal for generating a deflection current in the deflection winding in accordance with the sawtooth voltage and the control signal. A D.C.-coupled deflection circuit is formed with respect to the capacitor voltage. The change in the control signal compensates in the amplifier for the change in the average value of the capacitor voltage in a manner to maintain the vertical center unaffected when the rate of change of the sawtooth voltage is changed.

Figure 1A:
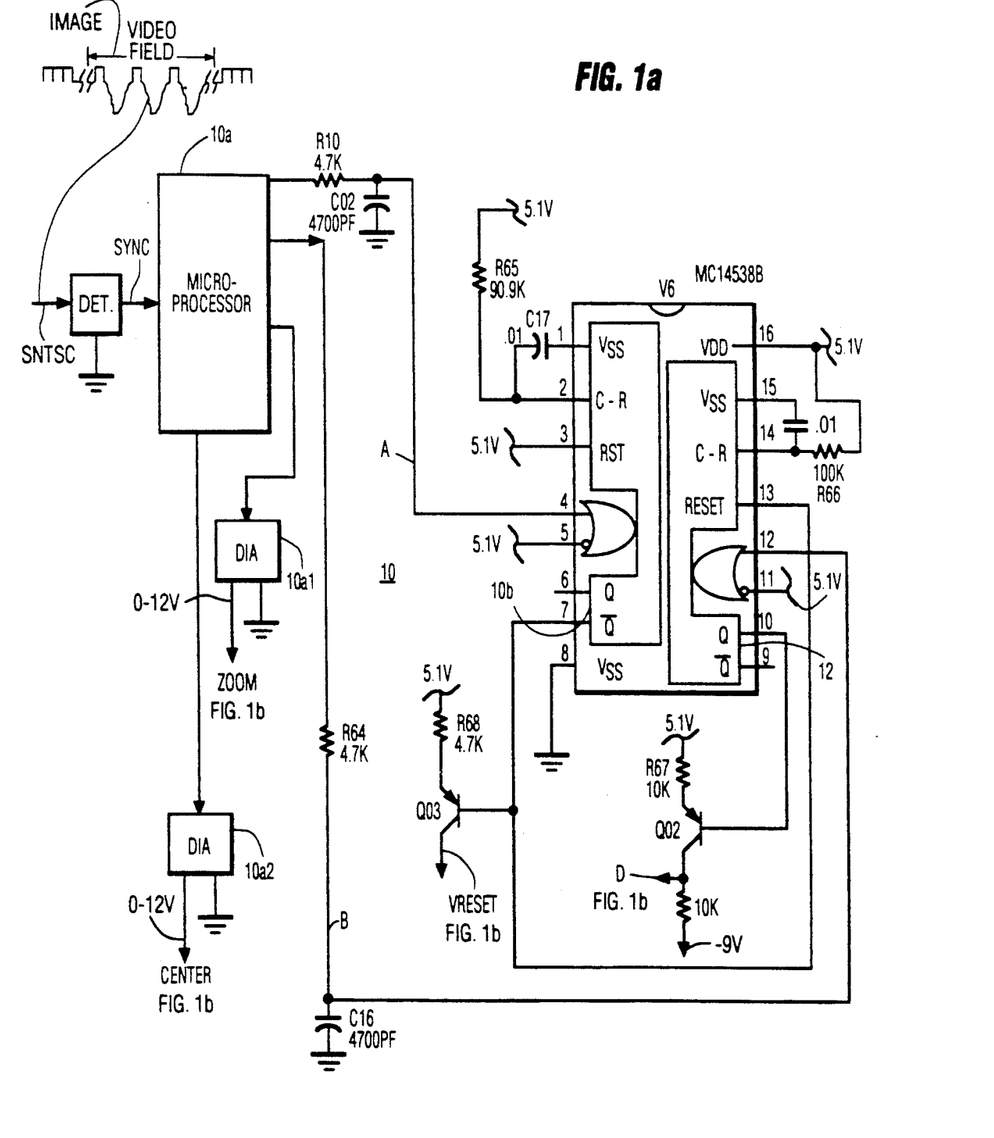
FIGS. 1a, 1b and 1c illustrate a vertical deflection circuit, embodying an aspect of the invention.
Figure 1B:
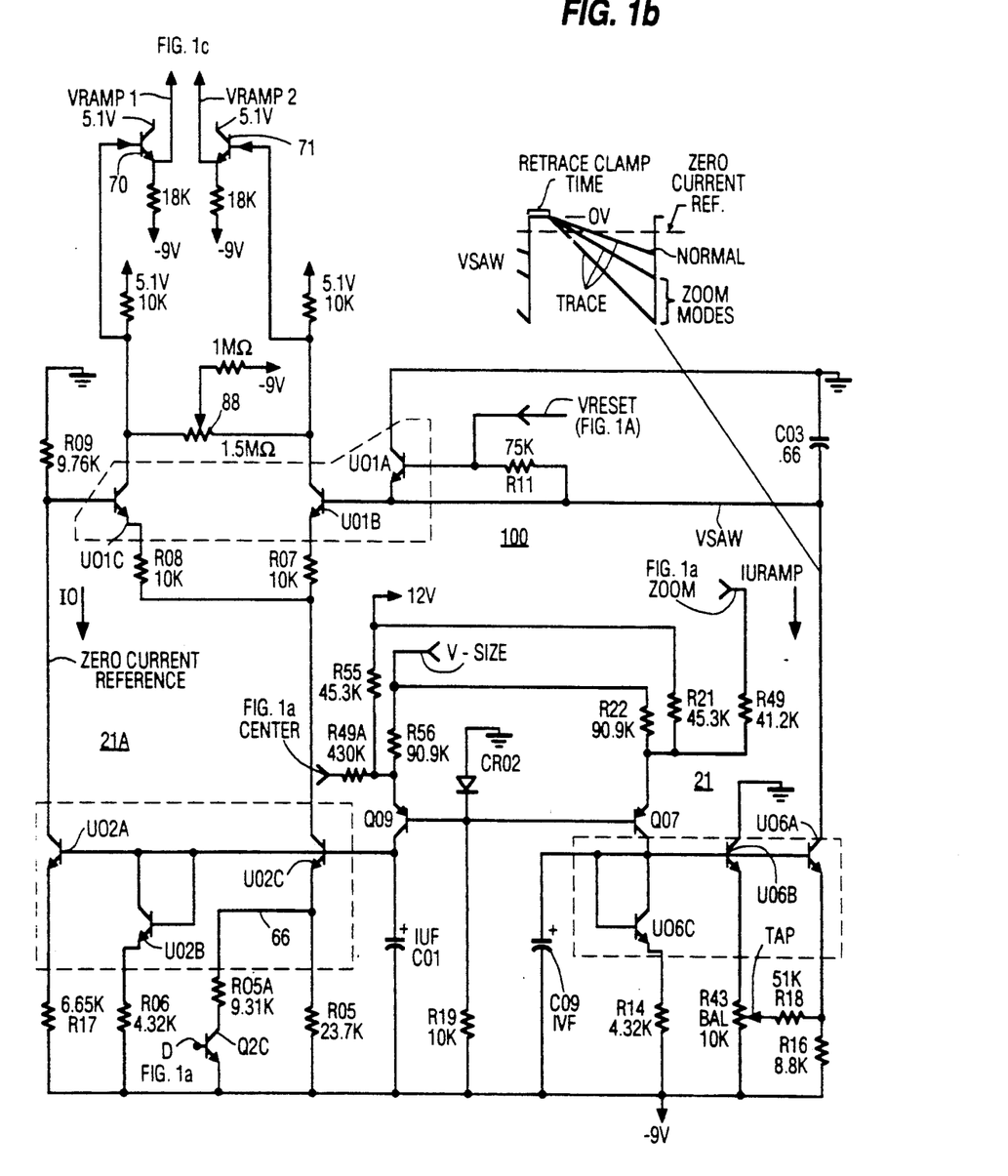
Figure 1C:
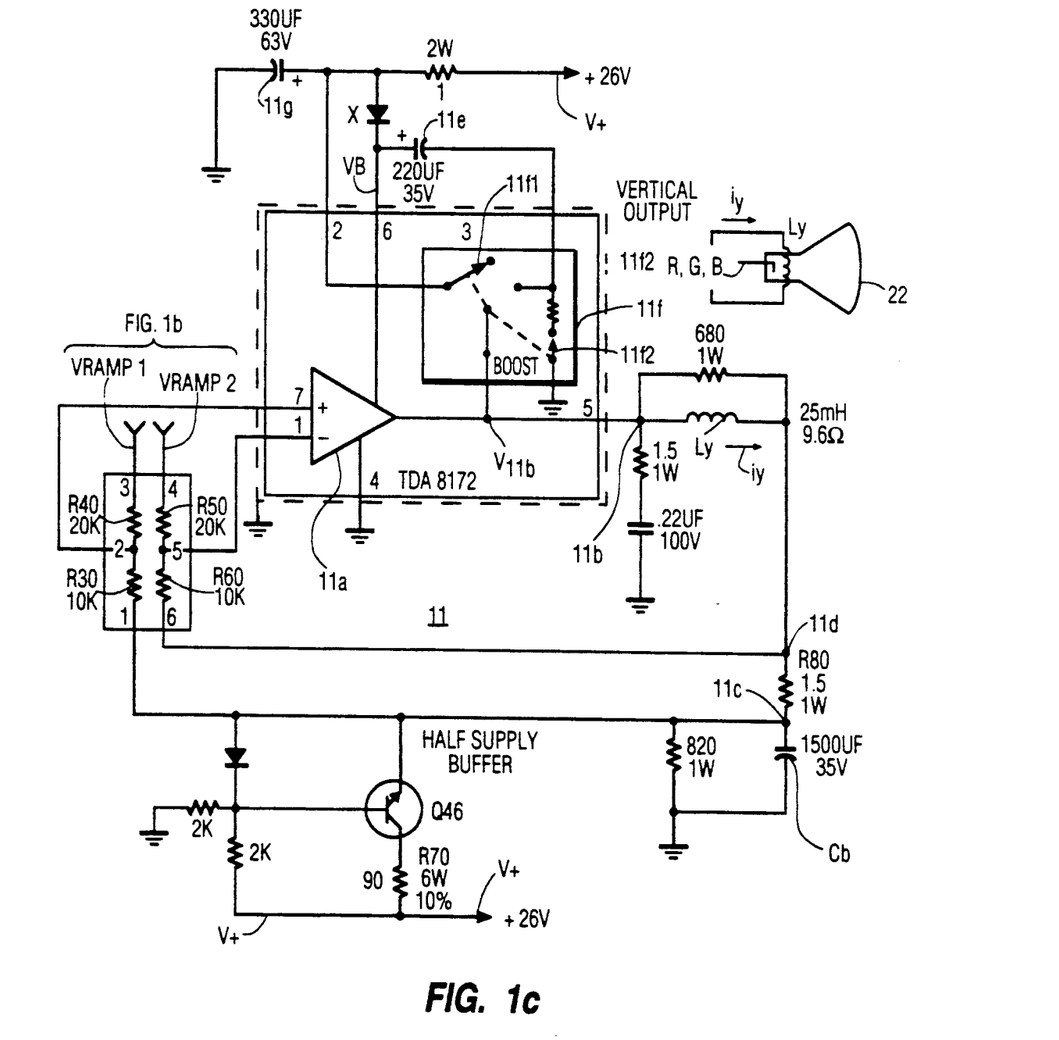

FIGS. 1a, 1b and 1c illustrate a vertical deflection circuit, embodying an aspect of the invention that includes a sawtooth generator 100. A vertical synchronizing signal SYNC of FIG. 1a is coupled to a vertical timing generator 10. Signal SYNC is produced by a video detector 9 of a television receiver that processes a baseband television signal SNTSC, conforming to the NTSC standard, for example. Signal SNTSC contains, between consecutively occurring signals SYNC, 262½ horizontal video lines that define a given picture image interval IMAGE of signal SNTSC. In NTSC type signal, the image interval contains the picture information of a single picture field. However, in a high definition television signal, not shown, the image interval may contain the picture information of, for example, a complete picture frame.

Figures 2A, 2B:
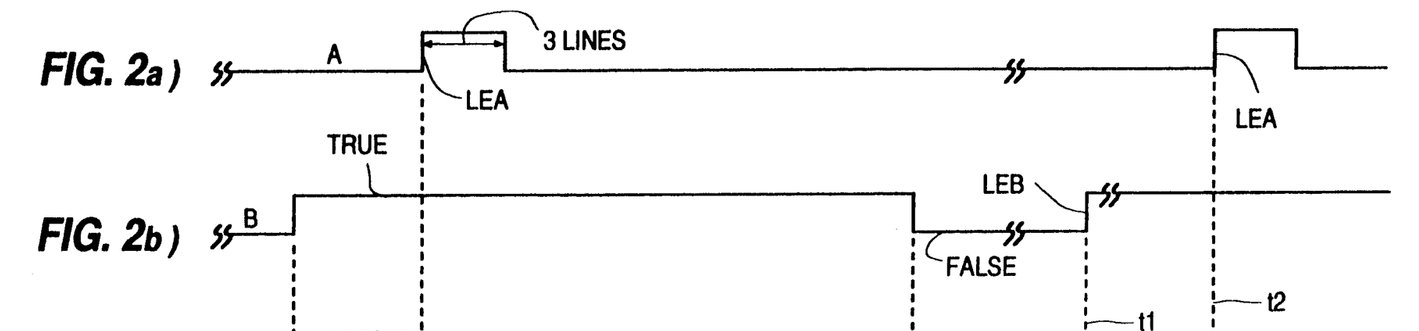
FIGS. 2a-2e illustrate idealized waveforms useful for explaining the operation of the arrangement of FIG. 1.

Generator 10 includes a microprocessor 10a that generates a vertical cycle synchronizing pulse signal A. Under user's control, microprocessor 10a generates pulse signal A of FIG. 2a that is delayed by a controllable amount TD relative to pulse signal SYNC of FIG. 2e. Similar symbols and numerals in FIGS. 1a, 1b, 1c and in FIGS. 2a-2e, that provide idealized waveforms, indicate similar items or functions. The amount by which pulse signal A of FIG. 2a is delayed varies in accordance with the degree of panning that is required by the user. To produce signal A, the information of sync pulse SYNC that occurs immediately prior to the display of the picture information of the present vertical field is used.

Figure 2C:
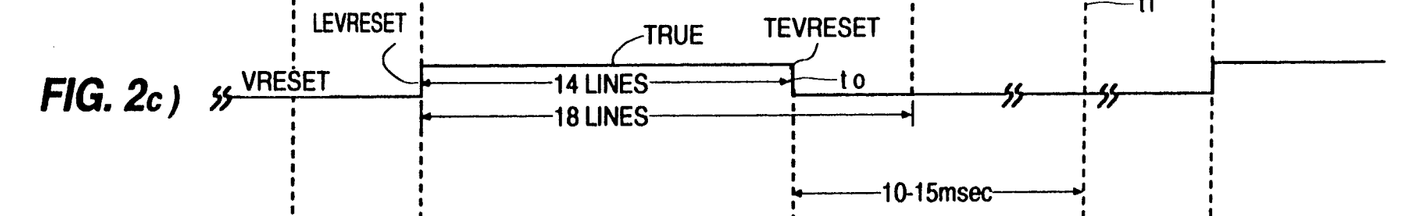

Signal A of FIG. 1a is coupled to a pulse stretcher one-shot or multivibrator flip-flop 10b that generates, through a transistor Q03, a vertical rate pulse signal VRESET, as shown in FIG. 2c. Signal VRESET has a pulse width that is equal to about the length of 14 horizontal video lines. Signal VRESET is coupled to a base of a transistor switch U01A of FIG. 1b. Transistor switch U01A is coupled across a capacitor C03 having a terminal that is at ground potential. In each vertical deflection cycle, signal VRESET causes a voltage VSAW across capacitor C03 to be clamped to zero volts and to maintain voltage VSAW at the zero volts level as long as pulse signal VRESET is generated. A leading edge LEVRESET of signal VRESET of FIG. 2c initiates vertical retrace, as explained later on.

Immediately after the occurrence of trailing edge TEVRESET, transistor U01A of FIG. 1b becomes nonconductive. A D.C. current IURAMP, produced in a collector of a transistor U06A of a voltage-to-current (V/I) converter 21, charges capacitor C03 to produce a ramping trace portion TRACE of sawtooth voltage VSAW, shown there. The rate of change of voltage VSAW is determined by the magnitude of controllable collector current IURAMP of transistor U06A.

V/I converter 21 is controlled by an analog voltage ZOOM that is produced in a digital-to-analog (D/A) converter 10a1 of FIG. 1a. D/A converter 10a1 is controlled by microprocessor 10a. Voltage ZOOM determines the degree of zoom that is required by the user in a manner to vary the rate of change of a vertical deflection current iy of FIG. 1c.

Voltage ZOOM of FIG. 1b is coupled via a resistor R49 of FIG. 1b to an emitter of a current control transistor Q07. An adjustable voltage V-SIZE that may be adjusted manually using a potentiometer, not shown, is coupled via resistor R22 to the emitter of transistor Q07 for picture height service adjustment purposes. In addition, a D.C. supply voltage of +12 V is coupled to the emitter of transistor Q07 via a resistor R21. The base of transistor Q07 is coupled to a diode CR02 that develops a temperature compensating base voltage equal to the forward voltage of diode CR02. The voltages that are coupled via resistors R21, R22 and R49 produce a collector current in transistor Q07 that develops a base voltage at a base of current source transistor U06A. The base voltage of transistor U06A, that is determined by the collector current of transistor Q07, is developed in a series arrangement of a temperature compensating transistor U06C, coupled as a diode, and a resistor R14.

A resistor R16 is coupled between the emitter of transistor U06A and a −9 V supply voltage. A transistor U06B has a base voltage that is equal to the base voltage of transistor U06A. A potentiometer resistor R43 is coupled between the emitter of transistor U06B and the −9 V voltage. A resistor R18 is coupled between the emitter of transistor U06A and an adjustable moveable contact TAP of resistor R43.

When contact TAP is adjusted to be close to a junction between the emitter of transistor U06B and resistor R43, resistor R18 has no effect on the emitter current in transistor U06A, because the emitter voltage of transistor U06B is equal to that of transistor U06A. On the other hand, when contact TAP is adjusted to be close to the other end of resistor 43, resistor R18 is coupled in parallel with resistor R16. The adjustment of potentiometer resistor R43 varies the emitter current of transistor U06A and the current gain of V/I converter 21.

In accordance with an inventive feature, when contact TAP is in contact with either end terminal of resistor R43, temperature related variations and tolerances of resistor R43 have no effect on the emitter current in transistor U06A. Only when contact TAP is located between the end terminals of resistor R43, resistor R43 can affect the emitter current in transistor U06A. In this way, the overall temperature stability over the entire range of positions of contact TAP is, advantageously, improved. Therefore, tolerances of sawtooth voltage producing capacitor C03 can be, advantageously, compensated.

Voltage VSAW is coupled to the base of a transistor U01B of a differential pair that also includes a transistor U01C. The base voltage of transistor U01C is developed in a resistor R09 having a terminal that is at ground potential. The values of resistor R09 and of a current I0 flowing in it determine the base voltage of transistor U01C.

In accordance with an aspect of the invention, the base voltage of transistor U01C tracks variation of height adjustment voltage V-SIZE in a manner to maintain vertical centering unaffected. Current I0 determines the level of voltage VSAW that produces approximately zero vertical deflection current, as explained later on.

To develop current I0, a V/I converter 21A that is similar to V/I converter 21 is utilized. A transistor Q09 produces a collector current that tracks a collector current in transistor Q07, when an adjustment in height adjustment voltage V-SIZE is made. Voltage V-SIZE is coupled to the emitters of transistors Q07 and Q09 via resistor R22 and R56, respectively. The base voltages of transistors Q09 and Q07 are equal. Transistor U02B and resistor R06 form a temperature compensated main load with respect to the collector current of transistor Q09. Similar load with respect to the collector current of transistor Q07 is formed by the network formed by transistor U06C and resistor R14. A transistor U02A of V/I converter 21A produces current I0.

In carrying out an inventive feature, current I0 tracks variations in current IURAMP of transistor U06A in a way to maintain vertical centering unaffected when a change in height adjustment voltage V-SIZE occurs. The tracking occurs because of circuit symmetry, for example, the symmetry with respect to transistors U06A and U02A. A transistor U02C produces the emitter currents of transistors U01C and U01B. An emitter resistor R17 establishes the value of a base voltage-to-collector current ratio in transistor U02A. A resistor R49A couples a voltage CENTER, generated in a D/A converter 10a2 of FIG. 1a, to the emitter of transistor Q09. Voltage CENTER is controlled in a manner to produce approximately equal collector currents in transistors Q09 and Q07 when the zoom mode is not selected. Voltage CENTER compensates for a non-zero offset value of voltage ZOOM when the zoom mode is not selected.

The base voltage of transistor U01C of FIG. 1b is controlled by current I0. The values of resistor R09 and current I0 are selected in such a way that the base voltage of transistor U01C is made equal to the level of voltage VSAW at the base of transistor U01B at the vertical center, when the regular, non-zoom mode is selected.

In carrying out another inventive feature, as a result of tracking between V/I converters 21 and 21A, any change in size adjustment voltage V-SIZE and in the 12 V supply voltage does not affect a ratio between currents I0 and IURAMP. The resulting variations in currents I0 and IURAMP maintain the base voltage of transistor U10C at the level of sawtooth voltage VSAW that corresponds to vertical center for each level of voltage V-SIZE and of the 12 V supply voltage. Therefore, vertical centering is, advantageously, unaffected by adjustment of voltage V-SIZE that is used for adjusting picture height.

The emitters of transistors U01B and U01C are coupled via emitter resistors R07 and R08, respectively, to a collector of transistor U02C that controls the sum of the emitter currents. The base voltage of transistor U02C is the same as that of transistor U02A. During vertical trace, the emitter voltage of transistor U02C, that is approximately equal to that of transistor U02B, produces an emitter current in transistor U02C that is determined by a parallel arrangement of a resistor R05 and a resistor R05A.

Figure 2D:
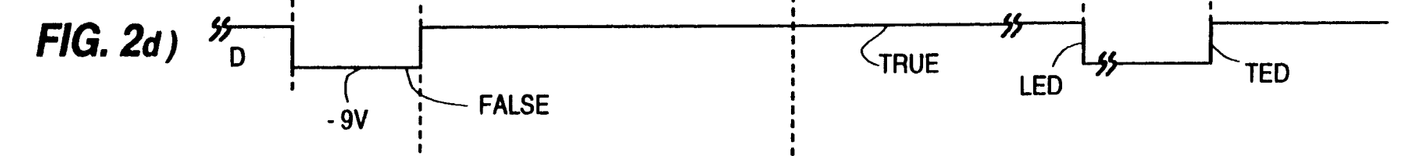

Resistor R05A of FIG. 1b is coupled across resistor R05 via a switching transistor Q2C that in the zoom mode of operation of FIG. 2d is nonconductive during interval t1-t2. During vertical trace, such as interval t0-t1, for zoom mode of operation, transistors U01B and U01C form a differential amplifier. The collector currents of transistors U01B and U01C develop, in corresponding collector resistors, voltages that are coupled via emitter follower transistors 71 and 70 to develop sawtooth signals VRAMP2 and VRAMP1, respectively.

FIGS. 3a-3d illustrate waveforms useful for explaining the operation of the arrangement of FIG. 1. Similar symbols and numerals in FIGS. 1a-1c, 2a-2c and 3a-3d indicate similar items or functions.

Figure 3A:
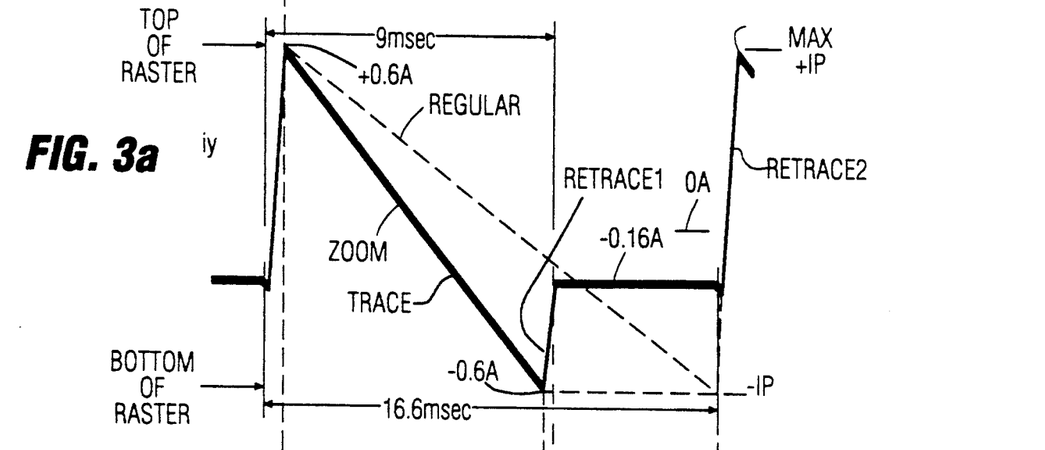
FIGS. 3a-3d illustrate waveforms useful for explaining the operation of the arrangement of FIG. 1 when top panning is provided.
Figure 3B:
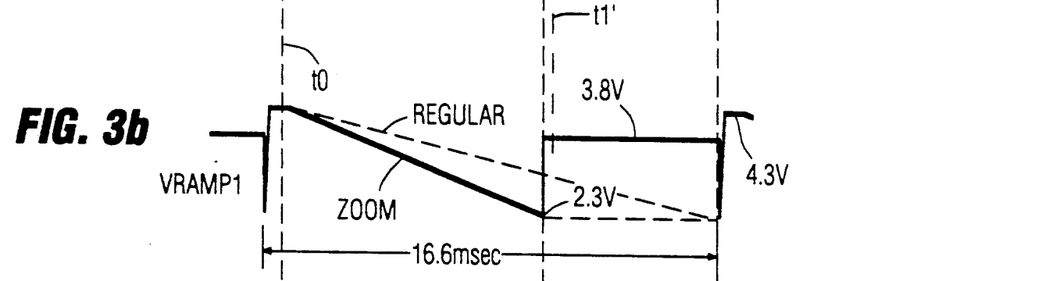
Figure 3C:
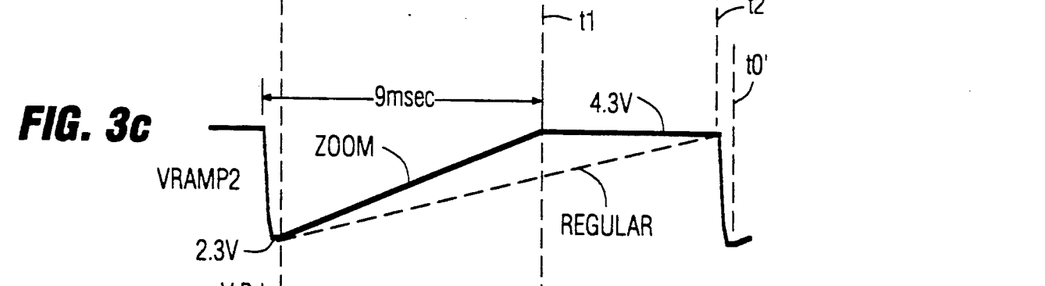

Signals VRAMP1 and VRAMP2 of FIGS. 3b and 3c, respectively, are complementary signals that change in opposite directions during vertical trace interval t0-t1. The waveforms of FIGS. 3b and 3c that are drawn in solid lines occur in the zoom mode of operation; whereas, the waveforms in broken lines occur in the regular or non-zoom mode of operation. Vertical trace occurs between, for example, time t0 and t1 when the zoom mode is selected, and between time t0 and time t2 when the zoom mode is not selected, as shown in the waveforms of FIGS. 3a-3c.

In carrying out an inventive feature, a D.C. coupled deflection circuit 11 of FIG. 1c, is controlled by signals VRAMP1 and VRAMP2. In circuit 11, a deflection winding Ly provides vertical deflection in a cathode ray tube (CRT) 22 of the type W86EDV093X710 having an aspect ratio of 16×9.

Winding Ly is coupled in series with a deflection current sampling resistor R80. Winding Ly and resistor R80 of FIG. 1c form a series arrangement that is coupled between an output terminal 11b of an amplifier 11a and a junction terminal 11c of a power supply decoupling capacitor Cb. A resistor R70 couples to terminal 11c via an emitter follower transistor Q46, a supply voltage V+ of, for example, +26 volts. Transistor Q46 produces a D.C. voltage at terminal 11c that is equal to about one-half of voltage V+. A junction terminal 11d, coupled between winding Ly and resistor R80, is coupled via a feedback resistor R60 to an inverting input terminal of amplifier 11a. Terminal 11c of resistor R80 is coupled via a resistor R30 to a noninverting input terminal of amplifier 11a. In this way, a negative feedback voltage that is developed across resistor R80 is applied to the input terminals of amplifier 11a. Complementary sawtooth signals VRAMP1 and VRAMP2 are coupled via resistors R40 and R50, respectively, to the noninverting and inverting input terminals, respectively, of amplifier 11a for controlling deflection current iy. Differences between signals VRAMP1 and VRAMP2 due to components mismatch or offset voltage tolerances, for example, are compensated by a potentiometer 88 that is coupled between the collectors of transistors U01B and U01C. The vertical trace portion of deflection current iy in winding Ly begins at time t0 of FIG. 2c of signals VRAMP1 and VRAMP2 of FIG. 1c.

Advantageously, transistors U01C and U01B of FIG. 1b provide vertical S-correction in CRT 22. S-correction is obtained as a result of operation in a nonlinear region in transistors U01C and U01B. Transistor characteristics cause the signal gain of the differential amplifier formed by transistors U01C and U01B to be smaller, at the beginning and end of vertical trace, when the current in a corresponding one of the transistors is small, than at the center of trace.

Figure 2E:
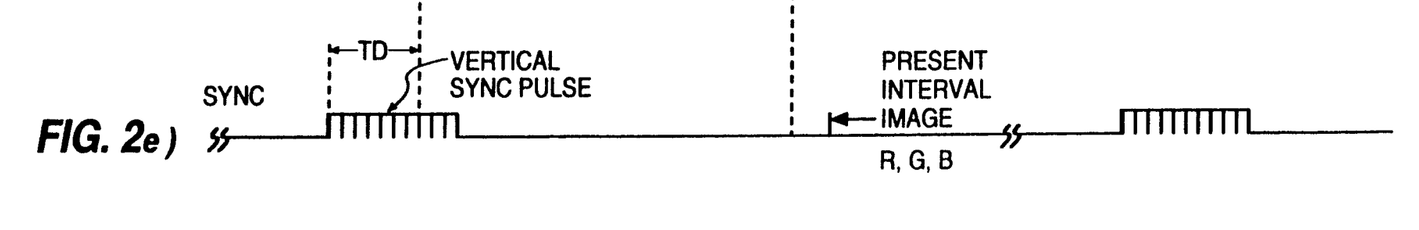

When top panning is utilized, signal VRESET of FIG. 2c that controls the beginning of the trace portion of signals VRAMP1 and VRAMP2 of FIG. 1b is produced from or synchronized to a vertical synchronization pulse signal SYNC of FIG. 2e. Signal SYNC is associated with the picture information that immediately follows signal SYNC in signal SNTSC. Signal SYNC occurs immediately prior to an image interval IMAGE of signal SNTSC. Image interval IMAGE of FIG. 2e contains the picture information that is, for example, presently displayed in CRT 22 of FIG. 1c. Interval IMAGE of FIG. 2e is referred to herein as the presently displayed image interval. Only signal SYNC of FIG. 2e that occurs immediately prior to interval IMAGE is associated with interval IMAGE, in accordance with the standard NTSC definition of signal SNTSC of FIG. 1a. Thus, the vertical trace portion of deflection current iy begins after the same delay time with respect to the vertical sync pulse, associated with the corresponding presently displayed image interval, in each field or image interval. As a result, deflection current iy of FIG. 1c is properly synchronized in each period. Therefore, advantageously, field-to-field variations of sync signal SYNC will not cause vertical position variations of the displayed picture.

Figure 3D:
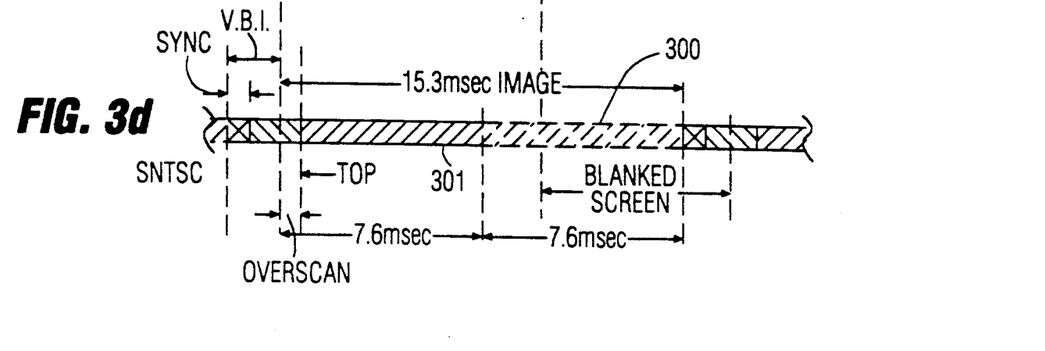

FIG. 3a illustrates in solid lines an example of the waveform of deflection current iy when a zoom mode of operation is selected. FIG. 3d illustrates schematically an example of the timing diagram of signal SNTSC of FIG. 1a. An interval 301 of interval IMAGE of FIG. 3d contains the picture information of the top half of the picture that would be displayed in a non-zoom mode of operation. An interval 300 contains the picture information of the bottom half of such picture.

A top panning mode of operation is obtained when a bottom portion of the displayed picture is cropped by a greater amount than a top portion. Thus, the example of FIGS. 3a and 3d depicts maximum top panning. This is so because a video line TOP that is the first video line of interval 301 of FIG. 3d capable of providing picture information in the non-zoom mode of operation is also the first video line to provide the picture information in the maximum top panning mode of operation of FIGS. 3a and 3d.

To provide regular, non-zoom mode of operation, the beginning time of a trace portion of current iy of FIG. 3a, shown in broken lines, may be delayed slightly less to keep the same video element at the top of the screen. The difference in delay compensates for the difference, that occurs in the beginning of vertical trace, between the rate of change of current iy of FIG. 3a in the zoom mode of operation and that in the regular, non-zoom mode of operation.

Signal SYNC of, for example, FIG. 3d controls the beginning time of vertical trace. Vertical trace begins, in each vertical field, at time t0 of FIGS. 3a-3d. Thus, vertical trace is synchronized on the basis of, for example, signal SYNC of FIG. 3d that occurs immediately prior to interval 301 of image interval IMAGE. Signal SYNC is associated with the presently displayed image interval IMAGE. In contrast, in the aforementioned Rodriguez-Cavazos, et al., arrangement, the sync signal that is associated with the preceding, and not with the presently displayed image interval, is utilized for synchronizing vertical trace when top panning is provided. Therefore, the aforementioned possibility for picture misalignment is advantageously prevented.

Figure 4A:
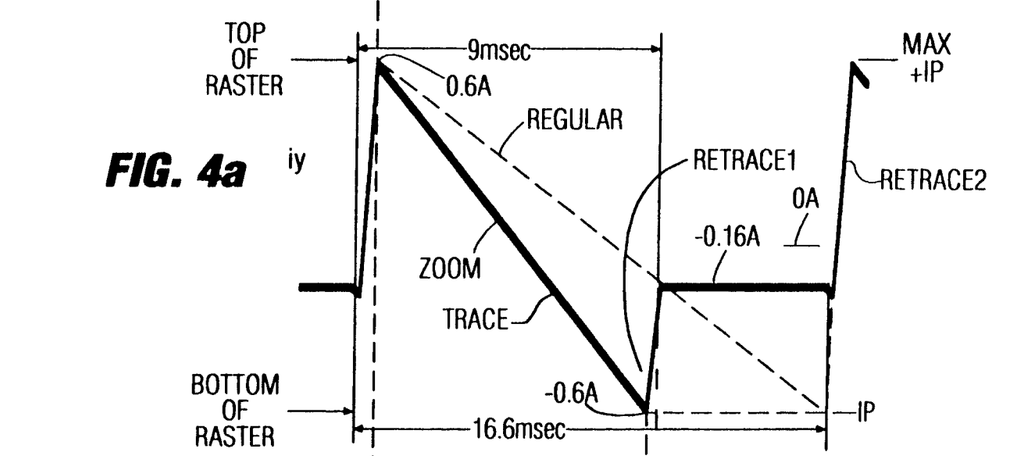
FIGS. 4a and 4b illustrate waveforms useful for explaining the operation of the arragement of FIG. 1 when bottom panning is provided.
Figure 4B:
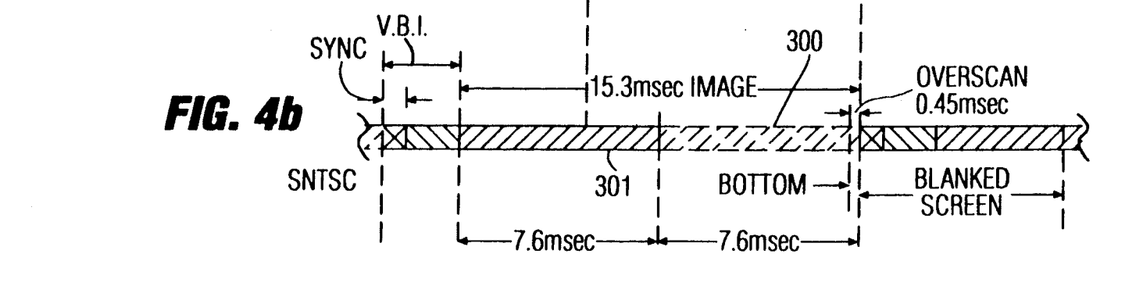

The example of FIGS. 4a and 4b illustrates the case when a video line BOTTOM that is the last video line of interval 300 of image interval IMAGE of FIG. 4b capable of providing picture information in the non-zoom mode of operation is also the last video line displayed to provide for maximum bottom panning. Similar symbols and numerals in FIGS. 4a, 4b, 3a-3d, 2a-2e and 1a-1c indicate similar items or functions. The delay of current iy of FIG. 4a with respect to signal SNTSC of FIG. 4b is significantly larger than the delay of current iy of FIG. 3a with respect to signal SNTSC of FIG. 3d.

Advantageously, deflection circuit 11 of FIG. 1c utilizes a positive supply voltage V+ and does not require a negative supply voltage for generating alternating current iy. In this way, the power supply, not shown, is simplified. Current limiting resistor R70 is coupled to voltage V+ for generating, via transistor Q46, the half supply voltage at terminal 11c.

It may be desirable to reduce the average or D.C. current through current limiting resistor R70 so that a large value of resistor R70 can be installed. The large value of resistor R70 is desirable to provide for current limitation so that excessive deflection current iy may be prevented when a fault condition occurs. Such fault condition may occur, for example, when output terminal 11b of amplifier 11a is shorted and assumes ground potential. It may also be desirable to prevent excessive deflection current iy in order to avoid damage to the neck of CRT 22 by a beam current strike.

Therefore, advantageously, deflection current iy is reduced or limited, in the zoom mode of operation, between time t1 of FIG. 3a, at the end of vertical trace, and time t2, immediately prior to the beginning of the next vertical retrace. To reduce current iy, microprocessor 10a of FIG. 1a generates a pulse signal B of FIG. 2b having a leading edge LEB that occurs when deflection current iy of FIG. 1c reaches a peak magnitude −Ip of FIG. 3a corresponding to the bottom of the raster. In a manner not shown, signal B is also used for beam blanking purposes, during interval t1-t2.

Signal B and an output signal of flip-flop 10b of FIG. 1a are coupled to a flip-flop 12 for producing, via a transistor Q2C, a pulse signal D at the base of a switching transistor Q2C of FIG. 1b. Signal D has a leading edge LED that substantially coincides with leading edge LEB of pulse signal B of FIG. 2b and a trailing edge TED that substantially coincides with a leading edge LEA of pulse signal A. When signal D of FIG. 2d is at a TRUE state, transistor Q2C of FIG. 1c is conductive. When transistor Q2C is conductive, sawtooth signals VRAMP1 and VRAMP2 vary in accordance with signal VSAW.

Between its leading edge LED and trailing edge TED, signal D is at the FALSE state and causes transistor Q2C of FIG. 1b to be nonconductive. When transistor Q2C is nonconductive, the collector current of transistor U02C decreases, a collector voltage of transistor U02C increases and transistor U01B is turned off. Therefore, the reduced collector current of transistor U02C flows entirely through the emitter of transistor U01C. Because the collector current in transistor U02C is reduced, the voltage difference between signals VRAMP1 and VRAMP2 of FIGS. 3b and 3c, respectively, during interval t1-t2, becomes substantially smaller than prior to the occurrence of the leading edge of pulse signal B of FIG. 1a. Therefore, deflection current iy of FIG. 3a, that is proportional to the voltage difference between signals VRAMP1 and VRAMP2, of FIGS. 3b and 3c, respectively, becomes small such as, for example, 25% of −Ip.

Because of the fast change in signal VRAMP1 in the vicinity of time t1 of FIG. 3b, deflection amplifier 11a ceases operating in a linear feedback mode and a voltage VB at the supply terminal is applied to deflection winding Ly. A retrace voltage $V_{11b}$ is produced immediately after time t1 and also immediately after time t2 of FIG. 3a, or twice in a given deflection cycle. A switch 11f1 of FIG. 1c of a boost stage 11f causes a capacitor 11g to be coupled in series with a boost capacitor 11e. Capacitor 11e is charged via a diode X and a switch 11f2 from the +26 V supply voltage V+, during vertical trace. A supply voltage, developed across filter capacitor 11g, is summed up with a voltage developed across boost capacitor 11e so as to form boost voltage VB. Voltage VB is decoupled from the +26 V supply voltage V+ via diode X, when boost voltage VB is formed.

During a short interval t1-t1' of FIG. 3a, a first partial retrace portion RETRACE1 of current iy is produced during which a first partial retrace operation is performed. During a following interval, t1'-t2, deflection amplifier 11a of FIG. 1c operates again in a linear feedback mode of operation. Linear operation is resumed because signals VRAMP1 and VRAMP2 are at constant levels sufficiently long time for obtaining a steady state feedback mode of operation.

During a second portion RETRACE2, a second partial retrace operation is performed. At time t2, stored magnetic energy in winding Ly of FIG. 1c is determined by the relatively small magnitude of current iy of FIG. 3a in deflection winding Ly of FIG. 1c. The aforementioned stored magnetic energy at time t2 of FIG. 3a is used to activate switch 11f1 for generating vertical retrace voltage $V_{11b}$ at terminal 11b of FIG. 1c that is larger than voltage V+. As previously discussed, switch 11f1 produces boost voltage VB when retrace voltage $V_{11b}$ at terminal 11b becomes larger than voltage V+.

Advantageously, current iy at time t2 of FIG. 3a has a low but non-zero, negative level. The negative polarity of current is at time t2 causes retrace voltage $V_{11b}$ of FIG. 1c to be at the required polarity for activating switch 11f1. Boost voltage VB that is approximately equal to twice the value of voltage V+ is applied to the transistor output stage, not shown, of amplifier 11a. Advantageously, voltage VB reduces the length of second retrace portion RETRACE2 of FIG. 3a needed for deflection current iy to attain the positive peak level +Ip, that occurs after leading edge LEA of FIG. 2b.

Without the voltage boost retrace speed-up function, when non-zoom or a small degree of zoom is selected, the time available for retrace portion RETRACE2 of FIG. 3a might not be sufficient for performing the retrace operation. When the small degree of zoom is selected, the time available for retrace portion RETRACE2 is shorter than when a higher degree of zoom is selected. Thus, advantageously, the reduction in the average value of current iy of FIG. 3a is accomplished without sacrificing the advantageous usage of the voltage boost function.

The voltage boost function is also utilized, during interval t1-t1', in retrace portion RETRACE 1. Interval t1-t1' occurs immediately after trace interval t0-t1. Thus, each of retrace portions RETRACE1 and RETRACE2 is speeded up by the operation of boost stage 11f.

What is claimed is:
1. A video display apparatus, comprising:
   a capacitor;
   a source of a first current coupled to said capacitor and responsive to a control signal for developing a ramping, trace portion of a sawtooth voltage in said capacitor having a rate of change that is adjusted in accordance with said first current such that a change in said control signal also causes a change in an average value of said capacitor voltage;
   switching means coupled to said capacitor for generating a retrace portion of said sawtooth voltage at a frequency related to a deflection frequency;
   a cathode ray tube;
   a deflection winding disposed on said cathode ray tube for producing a raster on a display screen of said cathode ray tube; and
   an amplifier responsive to said sawtooth voltage and to said control signal for generating a deflection current in said deflection winding in accordance with said sawtooth voltage and said control signal to form a D.C.-coupled deflection circuit with respect to said capacitor voltage such that said change in said control signal compensates in said amplifier for said change in said average value of said capacitor voltage in a manner to maintain a vertical center unaffected when said rate of change of said sawtooth voltage is changed.

2. An apparatus according to claim 1 wherein said deflection winding provides vertical deflection.

3. An apparatus according to claim 2 further comprising, an impedance, a source of a second current responsive to said control signal and coupled to said impedance for generating said second current in said impedance at a magnitude that is determined in accordance with said control signal to produce a third signal in said impedance that is indicative of vertical centering wherein said amplifier generates said deflection current in accordance with a difference between said sawtooth voltage and said third signal.

4. An apparatus according to claim 3 wherein each of said sources of said first and second currents comprises a voltage-to-current converter and wherein a change in said control signal produces changes in the same direction in each of said first and second currents.

5. An apparatus according to claim 3 wherein said amplifier comprises, a differential amplifier having an inverting input terminal that is responsive to one of said third signal and said sawtooth voltage and having a noninverting input terminal that is responsive to the other one of said third signal and said sawtooth voltage.

6. An apparatus according to claim 3 wherein said first and second currents vary in the same direction when an ambient temperature change occurs in a manner to maintain the vertical center unaffected by the temperature change.

7. An apparatus according to claim 1 wherein said control signal is adjusted to provide for picture height adjustment.

8. A video display apparatus, comprising:
a source of a vertical size control signal;
means responsive to said control signal for generating first and second currents at magnitudes that vary in accordance with said control signal such that the variations of said first and second currents track each other;
a sawtooth generator responsive to said first current for generating a sawtooth signal having an amplitude that is determined in accordance with said control signal;
a differential amplifier responsive to a reference signal and said sawtooth signal for generating a first output signal that is coupled to a vertical deflection winding to produce therein a vertical deflection current, said deflection current being coupled to said amplifier via a feedback path; and
means responsive to said second current for generating, outside said feedback path, said reference signal at a D.C. level that is determined in accordance with said control signal.

9. An apparatus according to claim 8, further comprising an output stage of said amplifier coupled to said vertical deflection winding wherein said reference and sawtooth signals are D.C. coupled to said vertical deflection winding via said output stage to form a D.C. coupled vertical deflection circuit.

10. An apparatus according to claim 8 wherein said differential amplifier comprises an input stage that generates complimentary sawtooth signals.

11. An apparatus according to claim 8 wherein said first current generating means is responsive to a zoom control signal for varying said first current in a manner that varies a rate of change of said sawtooth signal in accordance with said zoom control signal.

12. A video display apparatus, comprising:
a vertical deflection winding mounted on a cathode ray tube;
a differential amplifier responsive to a pair of complementary sawtooth signals and coupled to said deflection winding for generating a vertical deflection current therein;
means coupled to said deflection winding and to an input of said amplifier to form a feedback path for generating a feedback signal that is indicative of said deflection current; and
a sawtooth generator responsive to a vertical synchronization signal for generating said complementary sawtooth signals that are coupled to said input of said amplifier such that said sawtooth signals are generated outside said feedback path of said amplifier.

* * * * *